United States Patent [19]
Huang

[11] Patent Number: 5,460,398
[45] Date of Patent: Oct. 24, 1995

[54] FOLDABLE STROLLER

[76] Inventor: Li-Chu C. Huang, No. 9, Alley 2, Lane 606, Sec. 2, Po Ai Rd., Chia Yi City, Taiwan

[21] Appl. No.: 313,917

[22] Filed: Sep. 28, 1994

[51] Int. Cl.⁶ ....................................................... B62B 7/06
[52] U.S. Cl. ........................................... 280/642; 280/650
[58] Field of Search ................................... 280/650, 642, 280/47.4, 658, 655.1, 47.31

[56] References Cited

U.S. PATENT DOCUMENTS 5,244,228  9/1993  Chiu ......................................... 280/650

FOREIGN PATENT DOCUMENTS 2106048  4/1983  United Kingdom .................... 280/650
2248269  4/1992  United Kingdom ................. 280/47.38

Primary Examiner—Karin L. Tyson
Attorney, Agent, or Firm—Ross, Clapp, Korn & Montgomery

[57] ABSTRACT

A folding device for a stroller includes a positioning device securely mounted to an upper end of a front member and a retainer device mounted to an associated end of a handle of the stroller. The positioning device includes a groove therein, a sliding hook member slidably mounted in the groove and having a hook, a button having a first end pivotally mounted to the positioning device and a second resting on an upper end of the sliding hook member to actuate the sliding hook member, and a spring for biasing the sliding hook member upwardly. The retainer device includes a first end securely mounted to the associated end of the handle, a second end pivotally mounted to the positioning means, and a retainer member projecting transversely from a longitudinal direction thereof for releasably engaging with the hook of the sliding hook member.

7 Claims, 7 Drawing Sheets

FOLDABLE STROLLER

BACKGROUND OF THE INVENTION

1. Field of the Invention

The present invention relates to a foldable stroller and, more particularly, to a stroller which can be easily folded, and the fabric on the folded stroller is prevented from contacting with the ground.

2. Description of Related Art

A variety of devices have heretofore provided to strollers to improve the utility thereof, such as devices for controlling rotational direction of wheels, detachable and adjustable armrests, devices for changing orientation of handles, devices for adjusting inclination angle of the backrest, and devices allowing folding of the stroller.

A typical foldable stroller is shown in FIGS. 9 and 10 of the drawings and includes a pair of front members 80 and a handle member 90 having two ends thereof respectively connected to the upper ends of the front members 80. Each front member 80 has a positioning seat 81 at the upper end thereof and a connecting member 82 extending from a side of the positioning seat 81. The ends of the handle member 90 are respectively pivoted to the connecting members 82. An engaging seat 91 is mounted on each end of the handle member 90 and has a protrusion 92 and a spring-biased operative block 93 thereon. When folding the stroller, the operator firstly pulls the engaging seat 91 upwardly (see FIG. 10) by means of pressing the operative block 93 to urge the blocks 92 to disengage from the positioning seats 81. Thereafter, the handle member 90 may pivot to a folded status shown by the phantom lines in FIG. 10 for subsequent folding of the stroller which is conventional and therefore will not be further described.

However, the operator has to apply relatively large forces to pull the engaging seats 91 on both sides of the stroller as the stroller of such a structure cannot provide the palms or fingers of the operator with suitable grip. Furthermore, the folded stroller must rest against a wall when in an upright position, yet in which status the cloth thereof shall be in contact with the ground and thus get dirty.

Therefore, there has been a long and unfulfilled need for a stroller with an improved arrangement to mitigate and/or obviate the above-mentioned drawbacks.

SUMMARY OF THE INVENTION

In accordance with one aspect of the invention, a folding device for a stroller includes a positioning means securely mounted to an upper end of a front member and a retainer means mounted to an associated end of a handle of the stroller. The positioning means includes a groove therein, a sliding hook member slidably mounted in the groove and having a hook, a button having a first end pivotally mounted to the positioning means and a second end resting on an upper end of the sliding hook member to actuate the sliding hook member, and a spring for biasing the sliding hook member upwardly.

The retainer means includes a first end securely mounted to the associated end of the handle, a second end pivotally mounted to the positioning means, and a retainer member projecting transversely from a longitudinal direction thereof for releasably engaging with the hook of the sliding hook member. The retainer member includes an opening in an upper end thereof and a side surface, a passage being defined in the side surface and communicating with the opening.

By such an arrangement, when the stroller is in an extended position, the hook of the sliding hook member passes through the passage and extends into the opening of the retainer member to securely engage with the upper end of the retainer member, and when the button is pressed, the hook disengages from the retainer member to allow folding of the stroller.

Preferably, the positioning means includes a pair of spaced walls at a lower end thereof to define a longitudinal compartment for securely receiving the upper end of the associated front member. Each wall includes a lug extending therefrom, and the second end of the associated retainer means is pivotally mounted between the lugs.

The positioning means may have a cutout defined therein above the walls thereby forming a handgrip at an upper side thereof. Furthermore, the groove of each positioning means is defined in front of the handgrip and communicates with the longitudinal compartment, at least one guiding strip being formed on at least one of side walls which define the groove, and the sliding hook member having correspondingly formed structure for fittingly engaging with the guiding strip.

According to one embodiment of the invention, the upper end of the associated front member has a cap mounted thereto, the cap having an extension extending therefrom and having a stub thereon to which a first end of the spring is fixed. Furthermore, the sliding hook member includes a blind hole defined in an underside thereof for receiving a second end of the spring.

In accordance with another aspect of the invention, a folding device for a stroller includes a positioning means securely mounted to the associated end of the handle and a retainer means securely mounted to the upper end of the associated front member and pivotally mounted to the associated end of the handle.

The positioning means includes a groove therein, a sliding hook member slidably mounted in the groove and having a hook, a button having a first end pivotally mounted to the positioning means and a second end resting on an upper end of the sliding hook member to actuate the sliding hook member, and a spring for biasing the sliding hook member upwardly.

The retainer means includes a retainer member projecting transversely from a longitudinal direction thereof for releasably engaging with the hook of the sliding hook member, the retainer member including an opening in an upper end thereof and a side surface, a passage being defined in the side surface and communicating with the opening.

By such an arrangement, when stroller is in an extended position, the hook of the sliding hook member passes through the passage and extends into the opening of the retainer member to securely engage with the upper end of the retainer member, and when the button is pressed, the hook disengages from the retainer member to allow folding of the stroller.

Other objects, advantages, and novel features of the invention will become more apparent from the following detailed description when taken in conjunction with the accompanying drawings.

DESCRIPTION OF THE PREFERRED EMBODIMENTS

Figure 1:
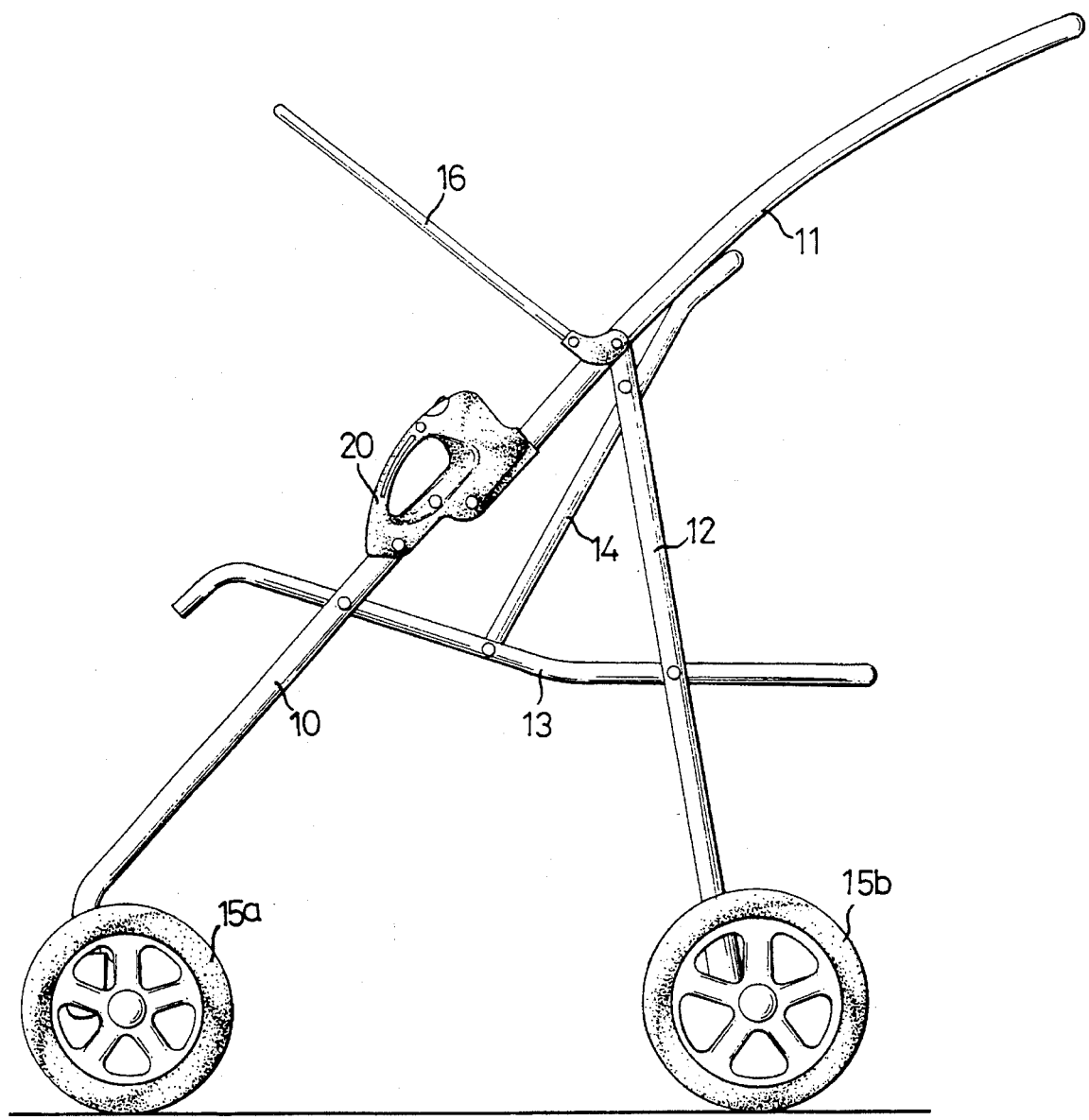
FIG. 1 is a schematic side elevational view of a foldable stroller with a folding device in accordance with the present invention.

Referring to FIGS. 1 through 5 and initially to FIG. 1, a stroller generally includes a pair of front members 10 each having a lower end to which a front wheel 15a is mounted, a pair of rear members 12 each having a lower end to which a rear wheel 15b is mounted, a substantially U-shaped seat frame member 13 pivoted to the front and rear members 10 and 12, and a substantially U-shaped handle 11 having two ends each of which is mounted to an associated front member 10 by a folding device. A substantially U-shaped backrest frame member 14 has two distal lower ends thereof respectively mounted to two limbs of the U-shaped seat frame member 13. A canopy supporting member 16 is removably mounted to the handle 11.

Figure 2:
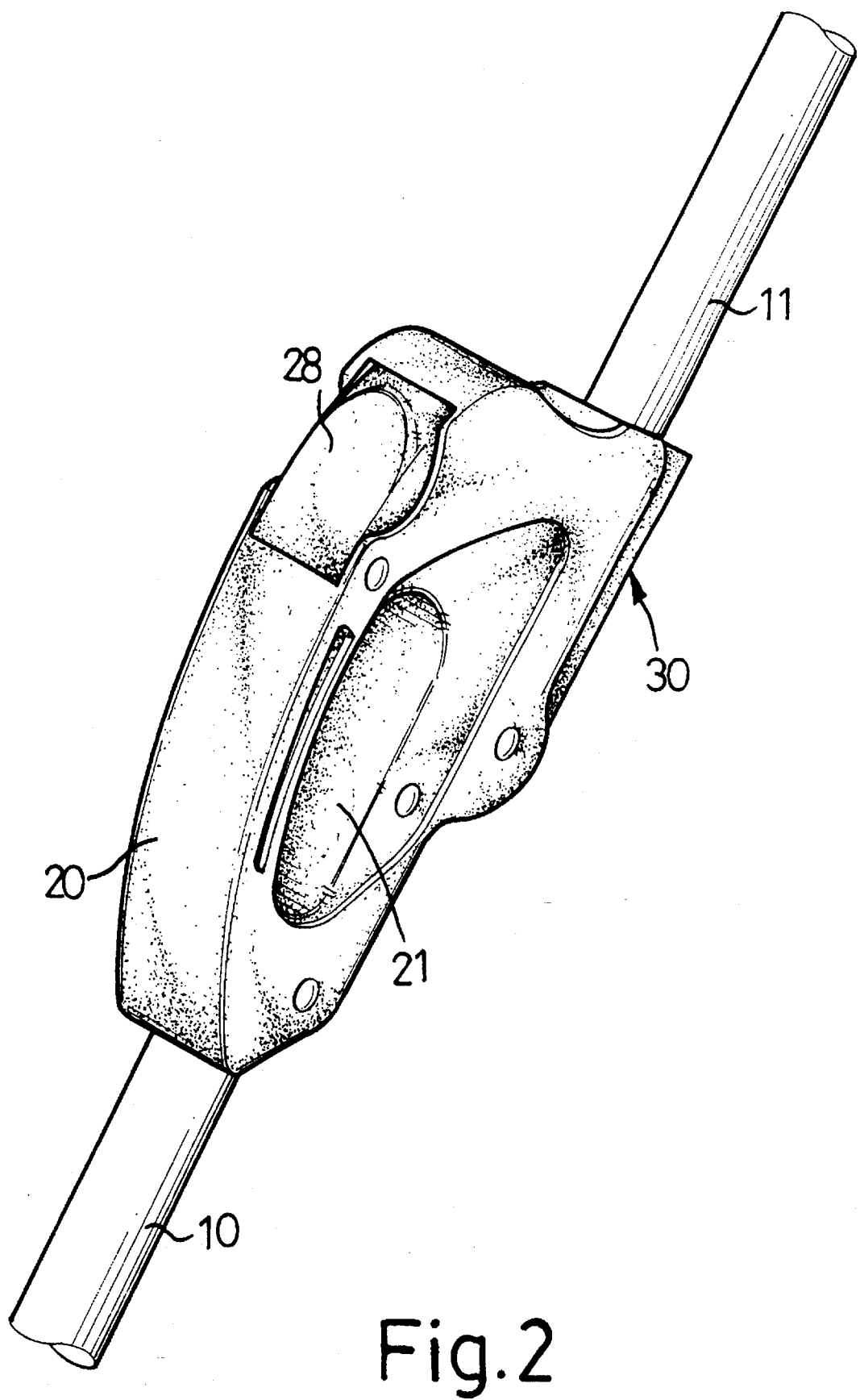
FIG. 2 is a partial perspective view illustrating the folding device mounted between an upper end of a front member and an end of a handle.
Figure 3:
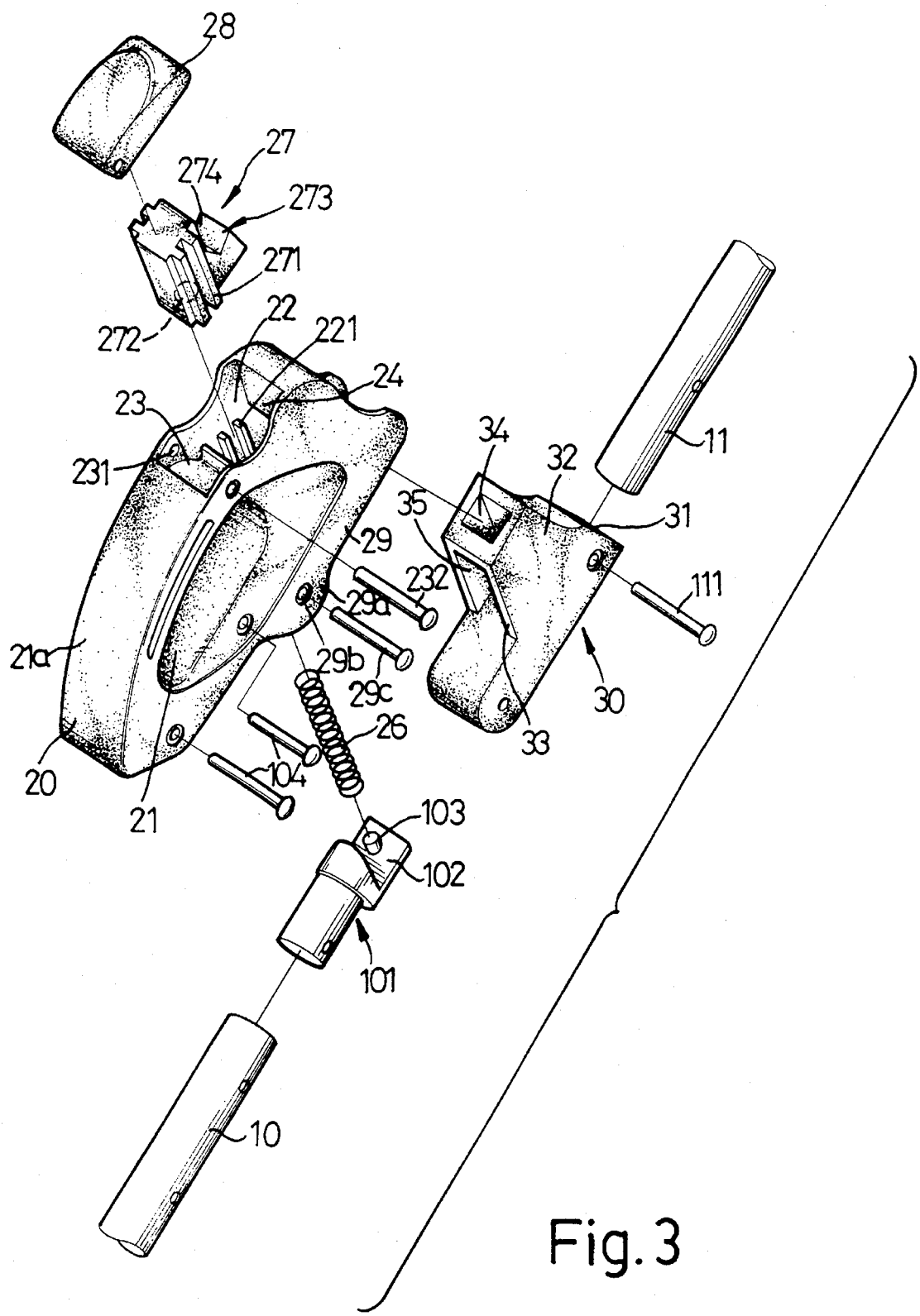
FIG. 3 is an exploded view of the folding device in FIG. 2.
Figure 4:
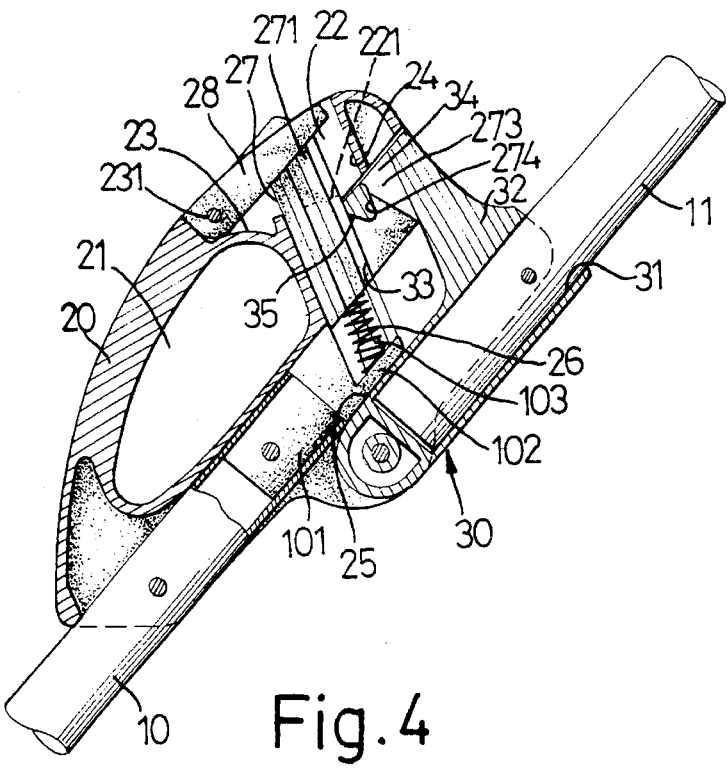
FIG. 4 is a side elevational view, partly in section, illustrating detailed structure of the folding device.
Figure 5:
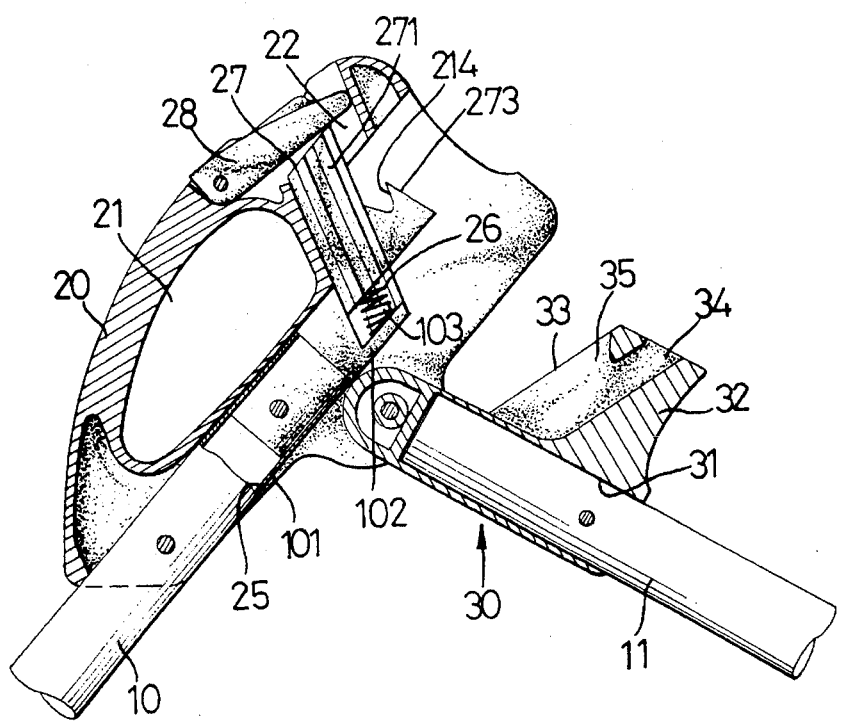
FIG. 5 is a side elevational view similar to FIG. 4, in which the folding device is in a folded status.

Referring to FIGS. 2 through 4, the folding device includes a positioning means 20 securely mounted to an upper end of the associated front member 10 and a retainer means 30 which has a first end securely mounted to an associated end of the handle 11, a second end pivotally mounted to the positioning means 20, and a retainer member 32 for releasably engaging with the positioning means 20. In this embodiment, the retainer means 30 includes a blind hole 31 for securely receiving the associated end of the handle 11.

As shown in FIG. 3, the positioning means 20 includes a pair of spaced walls 29 at a lower end thereof to define a longitudinal compartment 25 (see FIG. 4) for mounting the upper end of the associated front member 10 by two rivets 104. As can be seen in FIG. 3, the upper end of the associated front member 10 has a cap 101 mounted thereto, the cap 101 having an extension 102 extending therefrom and having a stub 103 thereon, the purpose of which will be explained hereinafter. Each wall 29 of the positioning means 20 includes a lug 29a extending therefrom and having a pin hole 29b for pivotally mounting the second end of the associated retainer means 30 by a pin 29c.

Above the walls 29, each positioning means 20 has a cutout 21 defined therein thereby forming a handgrip 21a at an upper side thereof. An oblique groove 22 is defined in each positioning means 20 to a rear of the handgrip 21a and communicates with the longitudinal compartment 25. A pair of guiding strips 221 are formed on each of two opposite side walls which define the oblique groove 22, and a sliding hook member 27 is slidably received in the groove 22. As clearly shown in FIG. 3, the sliding hook member 27 includes two strips 271 extending from two lateral sides thereof defining grooves therebetween for fittingly engaging with the guiding strips 221 thereby to be slidable along the groove 22, a blind hole 272 defined in an underside thereof, and a hook 273 with a beveled surface 274 projecting from an upper end thereof.

As shown in FIG. 4, a spring 26 has a first end mounted to the stub 103 which is located below the groove 22 and a second end received in the blind hole 272 of the hook member 27. A cutout 24 is defined in the positioning means 20 to a rear of the handgrip 21a and communicates with an upper end of the groove 22. A button 28 is received in the cutout 24 and has a first end pivotally mounted in a notch 23 defined adjacent to an upper end of the handgrip 21a by a pin 232 passing through two aligned pin holes 231 and a second end resting on the upper end of the sliding hook member 27.

Still referring to FIGS. 3 and 4, the retainer means 30 includes a first end securely mounted to an associated end of the handle 11 by a pin 111, a second end pivotally mounted between the lugs 29a of the positioning means 20 by pin 29c, and a retainer member 32 projecting transversely from a longitudinal direction thereof for releasably engaging with the hook 273 of the sliding hook member 27. The retainer member 32 includes an opening 34 in an upper end thereof and a beveled side surface 33 in which a passage 35 is defined and communicates with the opening 34.

The stroller is in an extended position when the folding device is in a status shown in FIG. 4 in which the hook 273 of the sliding hook member 27 passes through the passage 35 and extends into the opening 34 of the retainer member 32 to securely engage with the upper end of the retainer member 32. When folding the stroller, the operator firstly presses the button 28 on each folding device to cause downward movement of the sliding hook member 27 such that the hook 273 disengages from the retainer member 32. The handle 11 and the retainer members 32 thereon shall pivot downwardly due to their weights to a position shown in FIG. 5 for subsequent folding of the stroller which is conventional and therefore is not further described. After folding, the fabric (not shown) on the stroller shall not contact with the ground as it is located between the front and rear members 10 and 12. For extending the stroller, the steps for folding the stroller are reversed to a status shown in FIG. 5, and then the handle 11 is pivoted upwardly. The beveled surface 33 of each retainer member 32 pushes the beveled surface 34 of the associated hook 273 to cause slight downward movement of the sliding hook member 27. Thereafter, the sliding hook member 27 moves upwardly to a position shown in FIG. 4 under the action of the spring 26 such that the hook 273 of the sliding hook member 27 passes through the passage 35 and extends into the opening 34 to securely engage with the upper end of the retainer member 32 as mentioned above.

Figure 6:
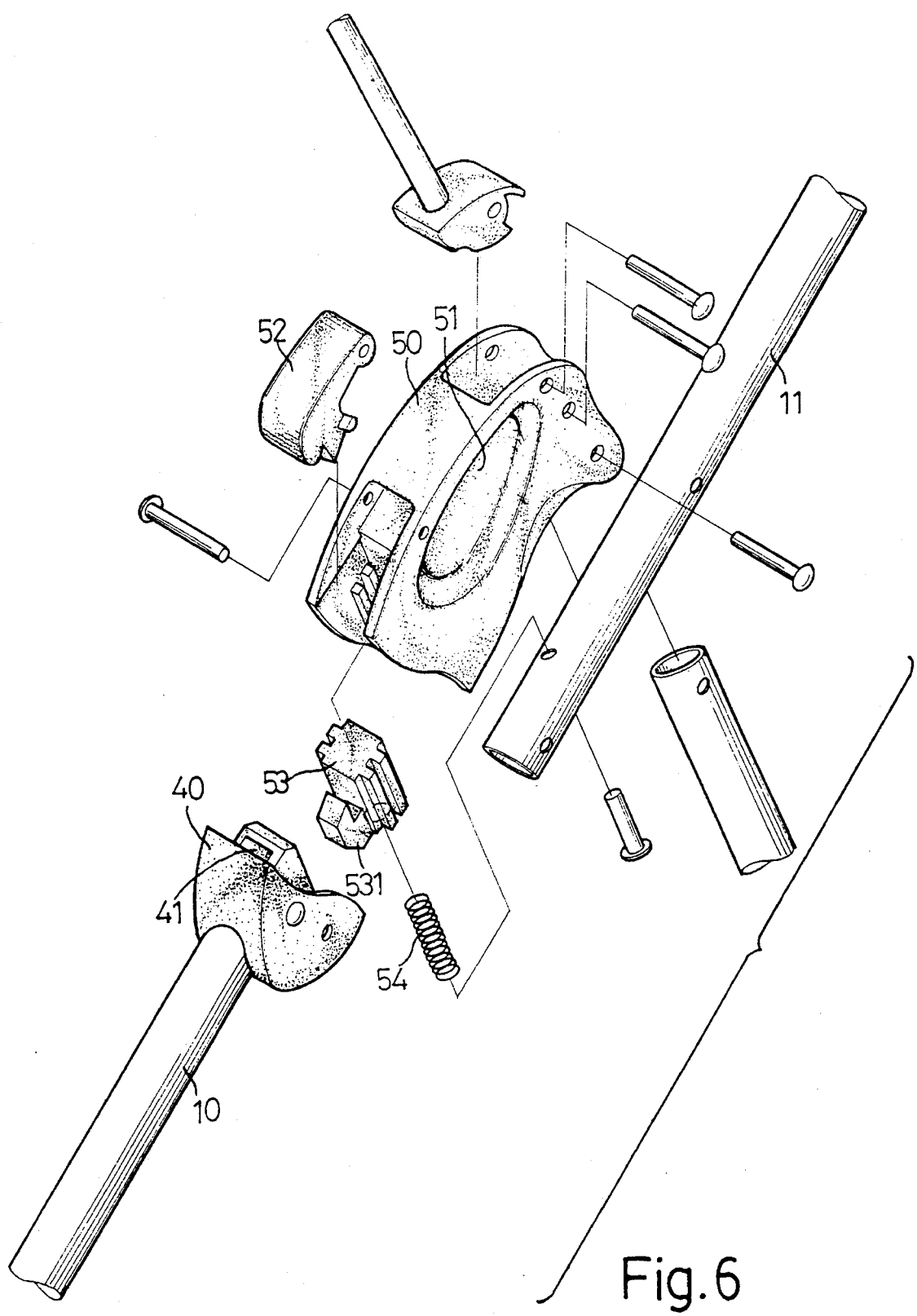
FIG. 6 is an exploded view of a second embodiment of a folding device in accordance with the present invention.
Figure 7:
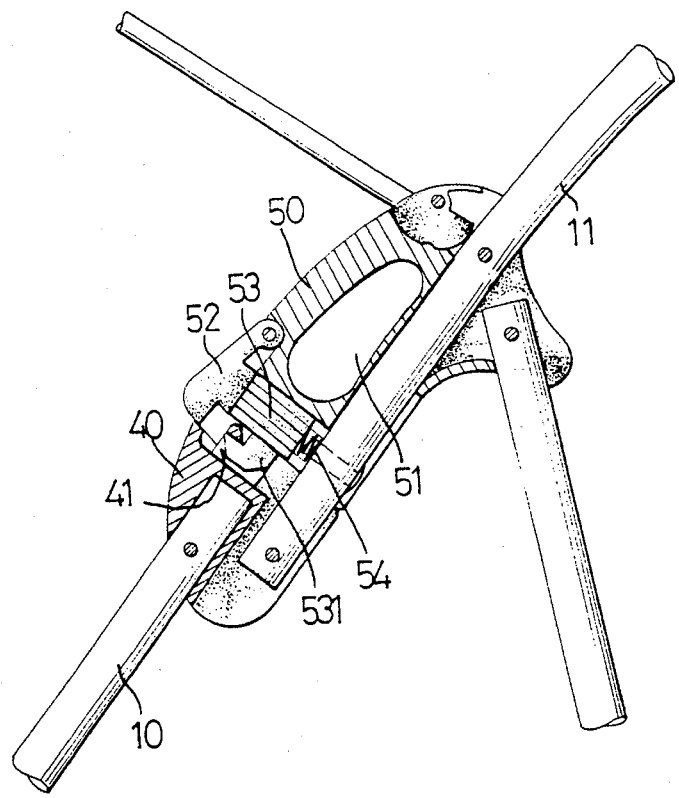
FIG. 7 is a schematic side elevational view, partly in section, illustrating the second embodiment of the folding device shown in FIG. 6.
Figure 8:
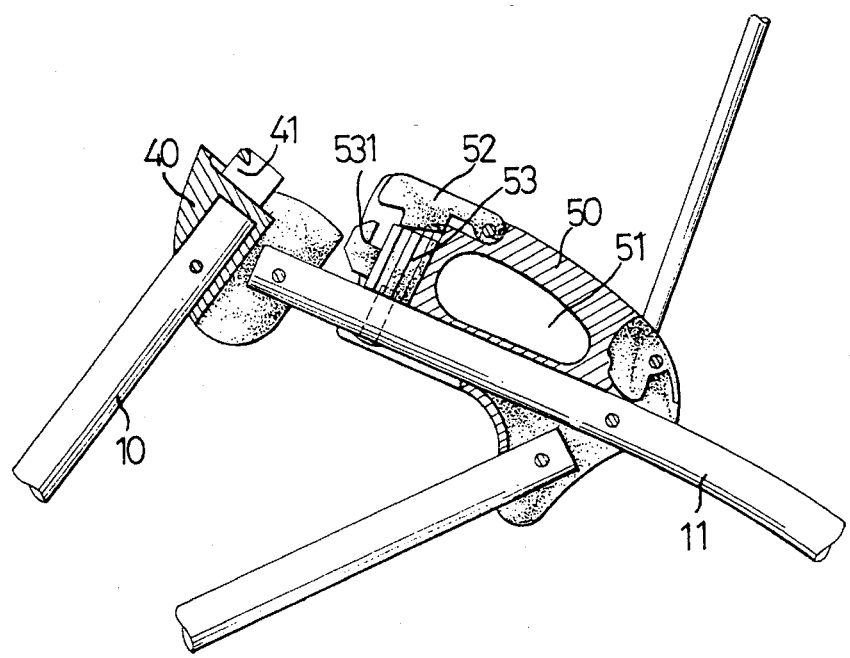
FIG. 8 is a side elevational view similar to FIG. 7, in which the folding device is in a folded status.
Figure 9:
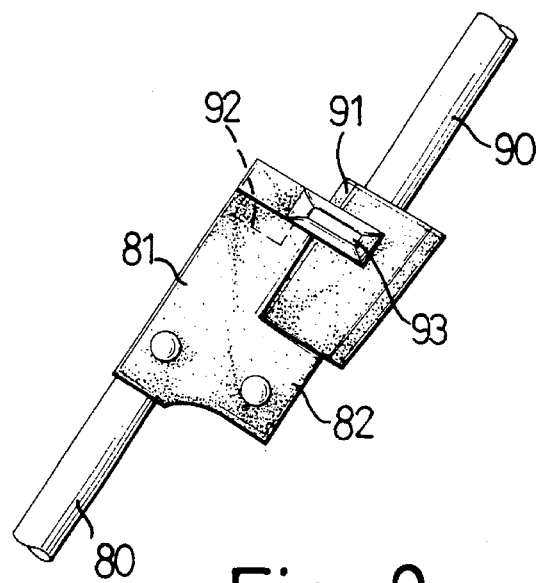
FIGS. 9 and 10 are schematic side views illustrating a folding device according to prior art.
Figure 10:
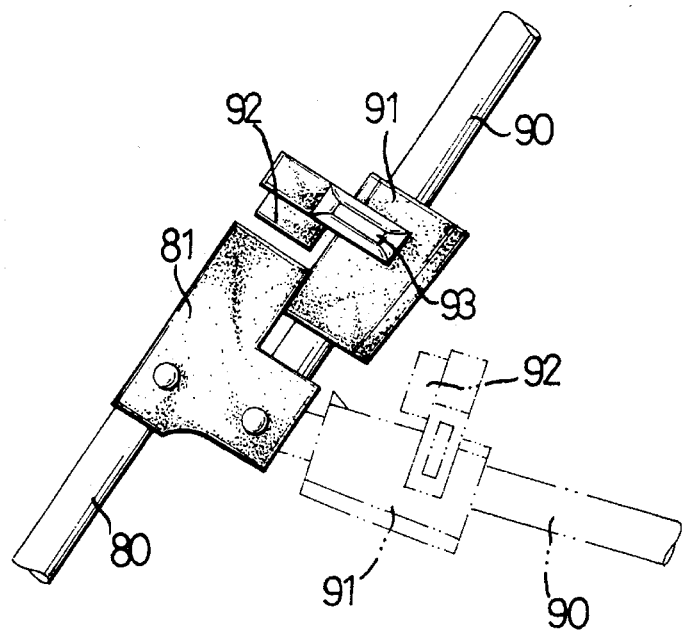

Refer to FIGS. 6 through 8 which show a second embodiment of the folding device in accordance with the present invention. As shown in FIGS. 6 and 7, the folding 19 device includes a positioning means 50 securely mounted to each end of the handle 11 and a retainer means 40 which is securely mounted to the upper end of the associated front member 10 and which is pivotally mounted to the associated end of the handle 11.

The positioning means 50 includes a cutout 51 therein thereby forming a handgrip, a button 52, a sliding hook member 53 having a hook 531 extending therefrom, a spring 54, the structure of which is substantially as that disclosed hereinabove. The difference between positioning means 50 and positioning means 20 is that the cap 101 of the first-mentioned embodiment is omitted, and that a lower end of spring 54 is mounted to a transverse pin (not numbered) which, in turn, is mounted to the end of the handle 11.

Although having a different outline, retainer means 40 has a structure substantially the same as that of retainer means 30 and also has an opening 41 in an upper end thereof for releasably engaging with the hook 531.

As shown in FIG. 8, when a user presses the button 52, the retainer means 40 disengages from the positioning means 50 thereby allowing folding of the whole stroller.

Accordingly, it is appreciated that the drawbacks encountered by the prior art foldable strollers are mitigated and/or obviated under the provision of the invention.

Although the invention has been explained in relation to its preferred embodiment, it is to be understood that many other possible modifications and variations can be made without departing from the spirit and scope of the invention as hereinafter claimed.

I claim:

1. A stroller including a folding device connecting an upper end of each of a pair of front members and an associated end of a handle of the stroller, comprising:

a positioning means securely mounted to the upper end of the associated front member and including a groove therein, a sliding hook member being slidably mounted in the groove and having a hook and an upper end, a button having a first end pivotally mounted to the positioning means and a second resting on the upper end of the sliding hook member to actuate the sliding hook member, and an elastic member for biasing the sliding hook member upwardly; and a retainer means including a first end securely mounted to the associated end of the handle, a second end pivotally mounted to the positioning means, and a retainer member projecting transversely from a longitudinal direction thereof for releasably engaging with the hook of the sliding hook member, the retainer member including an opening in an upper end thereof and a side surface, a passage being defined in said side surface and communicating with the opening;

whereby when the stroller is in an extended position, the hook of the sliding hook member passes through the passage and extends into the opening of the retainer member to securely engage with the upper end of the retainer member, and when the button is pressed, the hook disengages from the retainer member to allow folding of the stroller.

2. The stroller as claimed in claim 1 wherein the positioning means includes a pair of spaced walls at a lower end thereof to define a longitudinal compartment for securely receiving the upper end of the associated front member, each said wall of the positioning means includes a lug extending therefrom and the second end of the associated retainer means is pivotally mounted between the lugs.

3. The stroller as claimed in claim 2 wherein the positioning means has a cutout defined therein above the walls thereby forming a handgrip at an upper side thereof.

4. The stroller as claimed in claim 3 wherein the groove of each said positioning means is defined to a rear of the handgrip and communicates with the longitudinal compartment, at least one guiding strip being formed on at least one of side walls which define the groove, and the sliding hook member having correspondingly formed structure for fittingly engaging with the guiding strip.

5. The stroller as claimed in claim 1 wherein the sliding hook member includes a blind hole defined in an underside thereof, and the elastic member is a spring which has a fixed first end and a second end received in the blind hole of the sliding hook member.

6. The stroller as claimed in claim 5 wherein the upper end of the associated front member has a cap mounted thereto, the cap having an extension extending therefrom and having a stub thereon to which the first end of the spring is fixed.

7. A stroller including a folding device connecting an upper end of each of a pair of front members and an associated end of a handle of the stroller, comprising:

a positioning means securely mounted to the associated end of the handle and including a groove therein, a sliding hook member being slidably mounted in the groove and having a hook and an upper end, a button having a first end pivotally mounted to the positioning means and resting on the upper end of the sliding hook member to actuate the sliding hook member, and an elastic member for biasing the sliding hook member upwardly; and a retainer means securely mounted to the upper end of the associated front member and pivotally mounted to the associated end of the handle and having a retainer member projecting transversely from a longitudinal direction thereof for releasably engaging with the hook of the sliding hook member, the retainer member including an opening in an upper end thereof and a side surface, a passage being defined in said side surface and communicating with the opening;

whereby when stroller is in an extended position, the hook of the sliding hook member passes through the passage and extends into the opening of the retainer member to securely engage with the upper end of the retainer member, and when the button is pressed, the hook disengages from the retainer member to allow folding of the stroller.

* * * * *